(12) United States Patent
Gerhardt et al.

(10) Patent No.: US 7,796,745 B2
(45) Date of Patent: Sep. 14, 2010

(54) SYSTEMS AND METHODS FOR AUTOMATIC CALL COMPLETION

(75) Inventors: Alan L. Gerhardt, Pittsburg, TX (US);
Raymond Parker, Plano, TX (US);
Flint M. Calvin, Omaha, NE (US);
David Morgan, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1356 days.

(21) Appl. No.: 11/262,416

(22) Filed: Oct. 28, 2005

(65) Prior Publication Data
US 2007/0116201 A1   May 24, 2007

(51) Int. Cl.
*H04M 3/42* (2006.01)

(52) U.S. Cl. .................. 379/218.01; 379/221.12; 455/466

(58) Field of Classification Search ............ 379/218.01, 379/221.08, 221.12; 455/466, 560
See application file for complete search history.

(56) References Cited

U.S. PATENT DOCUMENTS

| | | | |
|---|---|---|---|
| 6,169,911 B1* | 1/2001 | Wagner et al. | 455/566 |
| 6,829,243 B1* | 12/2004 | Sundhar | 370/401 |
| 6,870,915 B2* | 3/2005 | Stillman et al. | 379/201.01 |
| 7,027,580 B2* | 4/2006 | Gamble | 379/218.01 |
| 2005/0054333 A1* | 3/2005 | Johnson | 455/414.3 |
| 2005/0238159 A1* | 10/2005 | Halsell | 379/218.01 |
| 2006/0056606 A1* | 3/2006 | Bocking et al. | 379/112.01 |

* cited by examiner

*Primary Examiner*—Olisa Anwah

(57) ABSTRACT

In one embodiment, a method for automatically completing a call includes receiving a text message containing a telephone number of a target party, extracting the telephone number from the text message, and providing the telephone number to a telephone switching control.

12 Claims, 7 Drawing Sheets

SYSTEMS AND METHODS FOR AUTOMATIC CALL COMPLETION

BACKGROUND

When a telephone user wishes to place a call to another person or entity, but does not know the correct telephone number, the user can place a call to directory assistance, sometimes referred to as "information." For instance, the user can call "411" to reach a live or automated operator, provide information as to the party the user wishes to call, i.e., the target party, and can receive the telephone number, typically from a speech synthesizer that "speaks" the number to the user.

Often, telephone systems provide automatic call completion to the target party. In such cases, the caller may, for example in exchange for a fee, be automatically connected to the target party without having to manually dial the telephone number provided by directory assistance. One known system for providing automatic call completion is schematically depicted in FIG. 1. In that figure, a calling party, party A, calls directory assistance, party B, with the intention of being connected to the target party, party C. When party A provides information about party C (e.g., identity information) to party B, party B provides the relevant telephone number to party A, for example with the speech synthesizer. When the telephone number is provided, a speech recognition device (SRD) connected to the line "listens" to the spoken telephone number to identify the various digits of the number. With that information, the number can be dialed by the system to automatically connect party A to party C.

There are several disadvantages to the above system. First, the speech recognition device may not be able to recognize the digits "spoken" by the speech synthesizer such that the follow-on call to party C cannot be completed. Alternatively, the speech recognition device may mis-recognize the digits spoken by the speech synthesizer such that a follow-on call is placed to an incorrect number.

Second, the above system is inefficient in its use of telephone system trunk lines. In particular, assuming party A is properly connected with party C, a first trunk line connecting party A with party B is used, and a second trunk line connecting party B with party C is used to enable communications between parties A and C. In addition to merely being inefficient, such a connection scheme is relatively expensive given that there are fees associated with trunk line usage.

Third, the above system can create difficulty with billing party A for the follow-on call to party C.

SUMMARY

Disclosed are systems and methods for automatic call completion. In one embodiment, a method for automatically completing a call includes receiving a text message containing a telephone number of a target party, extracting the telephone number from the text message, and providing the telephone number to a telephone switching control.

BRIEF DESCRIPTION OF THE DRAWINGS

The disclosed systems and methods can be better understood with reference to the following drawings. The components in the drawings are not necessarily to scale.

DETAILED DESCRIPTION

As is described above, known automatic call completion systems used in directory assistance comprise various disadvantages. As is described in the following, however, such disadvantages can be avoided through the use of text messaging. More particularly, by text messaging a telephone number of the target party to an automated call manager when the telephone number is audibly provided to the calling party, the telephone number can be extracted and provided to a telephone switching control that, if desired, completes the follow-on call to connect the calling party directly to the target party.

Disclosed in the following are systems and methods for automatic call completion. Although particular embodiments of the systems and methods are disclosed in the following, these embodiments are provided for purposes of example only to facilitate description of the disclosed systems and methods.

Figure 1:
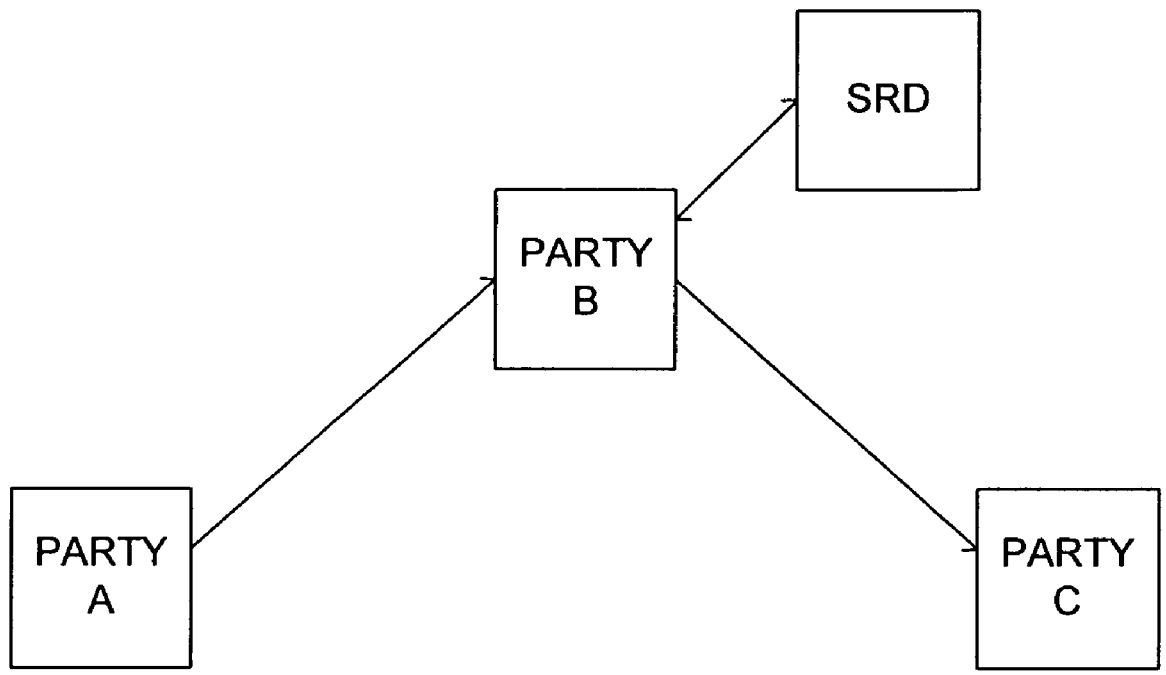
FIG. 1 is a schematic depiction of a prior art system for providing automatic call completion.
Figure 2:
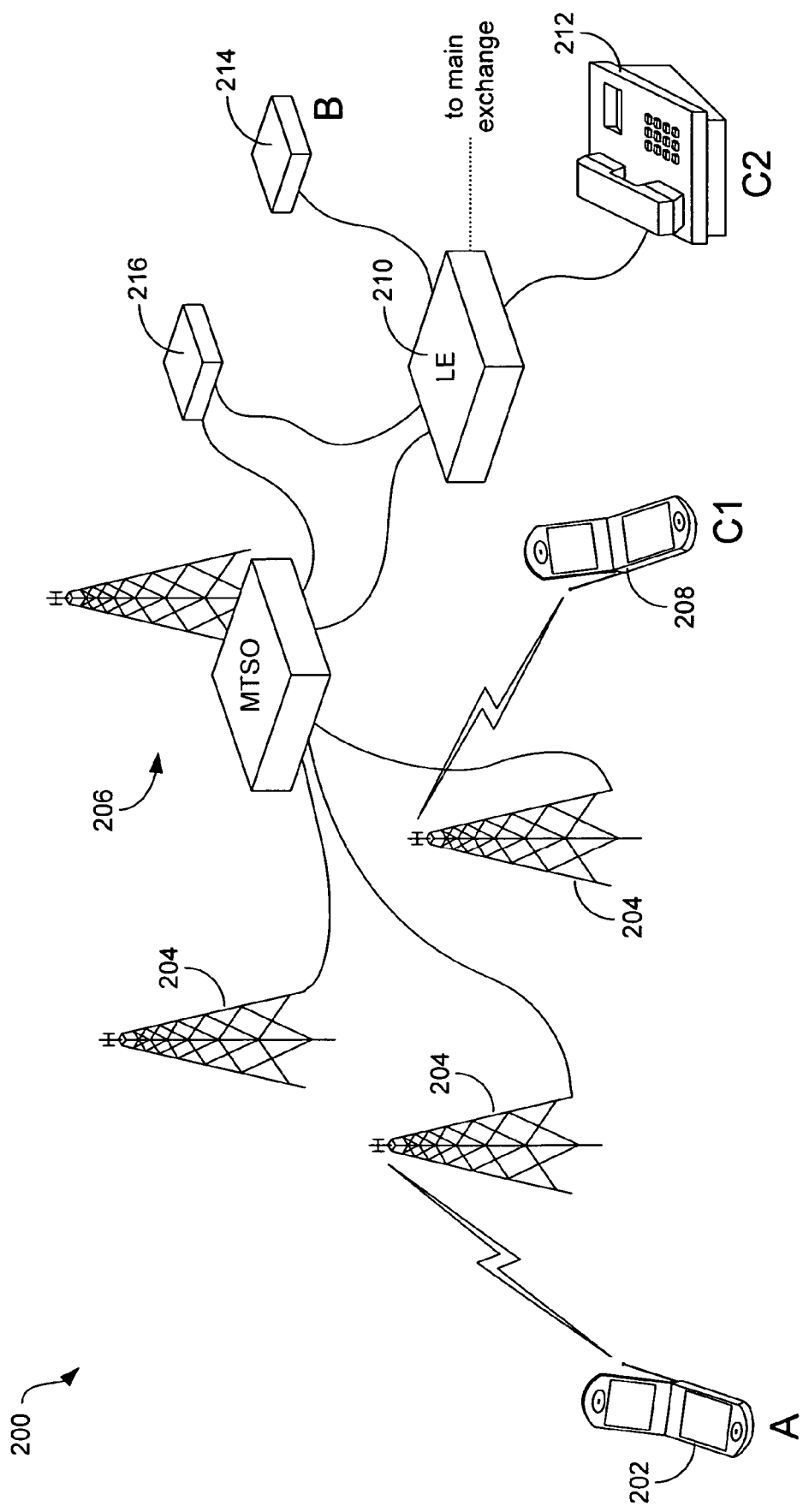
FIG. 2 is a schematic depiction of an embodiment of a telephone system in which automatic call completion in accordance with the disclosed systems and methods can be conducted.

Referring now in more detail to the drawings, in which like numerals indicate corresponding parts throughout the several views, FIG. 2 illustrates an example telephone system 200 in which automatic call completion can be performed. As is indicated in that figure, the system 200 comprises a caller telephone 202. In the illustrated embodiment, the caller telephone comprises a mobile telephone. Therefore, the remainder of the system 200 assumes that the calling party's telephone is a mobile telephone. It is noted, however, that the automatic call completion described herein can be performed in cases in which the calling party calls from a non-mobile (i.e., land-based) telephone. In keeping with the labeling convention used in FIG. 1, the caller telephone 202 is labeled "A" to identify that it is used by the calling party A.

As is further illustrated in FIG. 2, the system 200 includes a plurality of base stations 204 that can receive wireless (i.e., radio frequency (RF)) transmissions from and provide wireless transmissions to the caller telephone 202. Although only three such base stations 204 are depicted in the figure, the system 200 can, of course, comprise many base stations to enable the caller telephone 202 to remain connected to the system as the telephone is moved from place to place (e.g., cell to cell). The base stations 204 are connected (e.g., through a wired connection) to a mobile telephone switching office (MTSO) 206, or other telephone switching control, that controls all of the base stations 204 in the region. Through its connection to all of the base stations 204, the MTSO 206 can direct calls to a first target party, party C1, who uses a mobile telephone 208.

The MTSO 206 is connected (e.g., through a wired connection) to a local exchange (LE) 210 that comprises part of a land-based telephone system. The local exchange 210 is linked to a second target party, party C2, through various components of the land-based telephone system (not shown). Unlike party C1, party C2 uses a land-based telephone 212.

Further comprised by the telephone system 200 is a directory assistance system 214, designated party B. The directory assistance system 214 is configured to provide telephone numbers of target parties, such as parties C1 and C2. As is described in greater detail below, the directory assistance system 214 is further configured to provide telephone numbers in text messages for the purpose of facilitating automatic call completion to a target party.

The telephone system 200 of FIG. 2 further comprises an automated call manager 216 that also facilitates automatic call completion to a target party in the context of a directory assistance scenario. As is described in greater detail below, the automated call manager 216 is configured to receive text messages from the directory assistance system 214, extract telephone numbers from those text messages, and provide those telephone numbers to a telephone switching control, such as the MTSO 206 or local exchange 210 for the purpose of connecting a calling party (e.g., party A) to a target party (e.g., party C1 or party C2).

Figure 3:
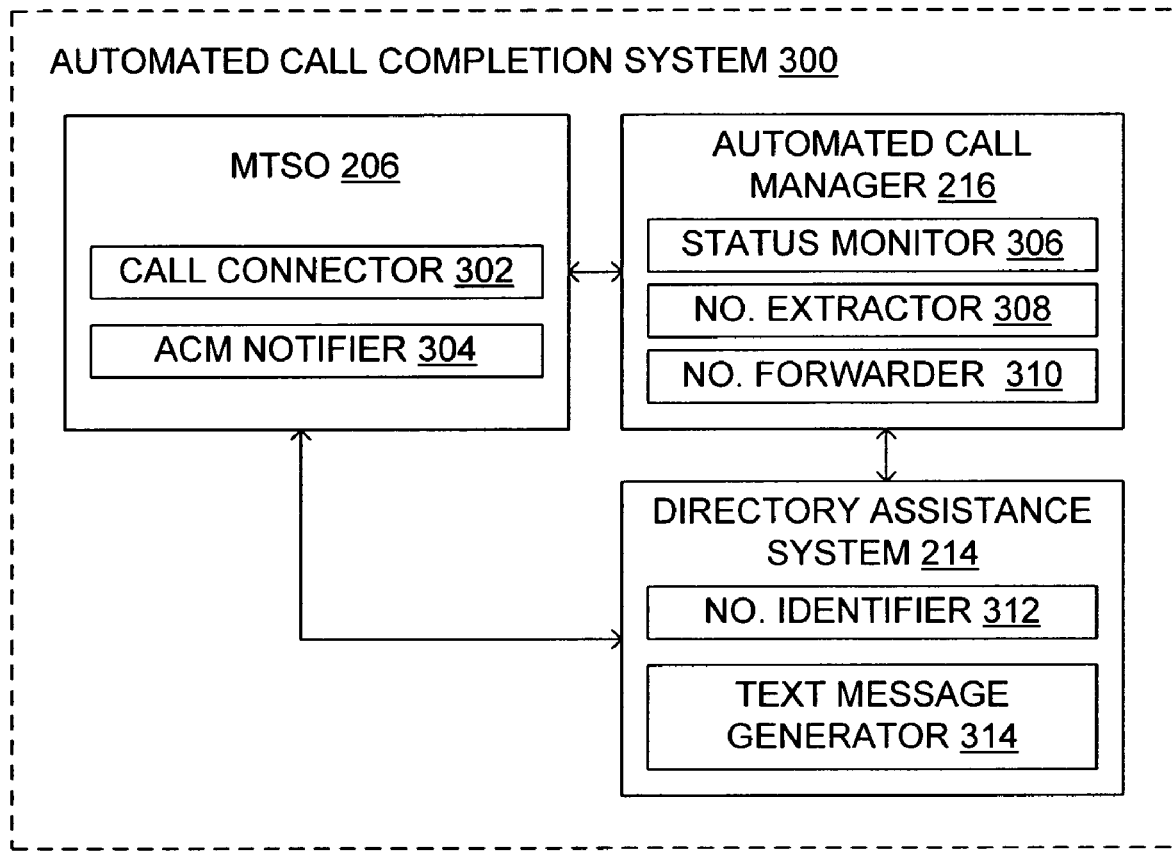
FIG. 3 is a block diagram of an embodiment of an automated call completion system embodied in the telephone system of FIG. 2.

FIG. 3 is a block diagram of an automated call completion system 300 that is configured to automatically complete calls to target parties in the context of a directory assistance scenario. The system 300 is a conceptual system that can be thought of as incorporating various components of the telephone system 200 that are used to automatically complete a follow-on call to the target party sought to be connected to through the directory assistance call. As is shown in FIG. 3, the illustrated embodiment of the automated call completion system 300 includes the MTSO 206, the directory assistance system 214, and the automated call manager 216. Each of these components is illustrated as comprising functional logic (e.g., software) for performing various discrete functions used in automatically completing a call. Notably, each component may comprise other logic, which has been omitted as being beyond the scope of the present disclosure.

Beginning with the MTSO 206, the MTSO comprises call connector 302 that handles all incoming telephone connections to the base stations 204 (FIG. 2) and to the land-based telephone system (e.g., to local exchange 210). In addition, the MTSO 206 includes an automated call manager notifier 304 that notifies the automated call manager 216 of various status information, such as placement of a directory assistance call and connection and disconnection of the directory assistance system 214.

The automated call manager 216 comprises a status monitor 306 that monitors for the status provided by the MTSO 206, a telephone number extractor 308 that extracts telephone numbers from received text messages, and a telephone number forwarder 310 that forwards the extracted telephone numbers to the MTSO 206.

Finally, the directory assistance system 214 comprises a telephone number identifier 312 that identifies the telephone numbers of target parties from information provided by a calling party, and a text message generator 314 that generates text messages that comprise the identified telephone numbers. The text message generator 314 is configured to send the text messages at least to the automated call manager 216 and, in some embodiments, to the calling party's telephone. It is noted that, in some embodiments, the automated call manager 216 and the directory assistance system 214 can be integrated together in a single system, if desired.

Figure 4:
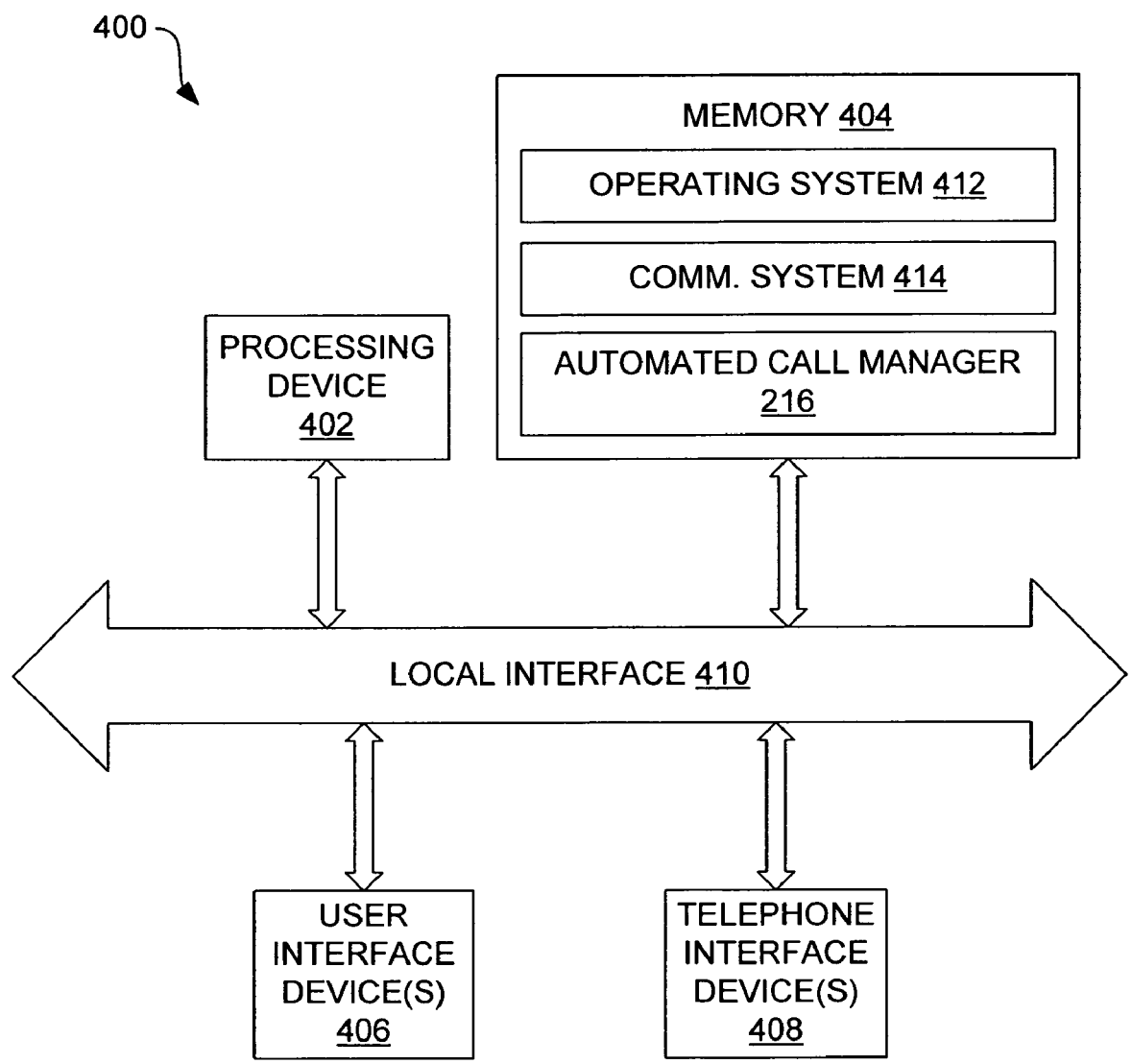
FIG. 4 is a block diagram of an embodiment of a computer system that supports the automated call manager shown in FIG. 3.

Each of the components of the automated call completion system 300 can be provided on one or more computer systems. FIG. 4 is a block diagram illustrating an example architecture for a computer system 400 that supports the automated call manager 216. As is indicated in FIG. 4, the computer system 400 comprises a processing device 402, memory 404, one or more user interface devices 406, and one or more telephone system interface devices 408. Each of those components is connected to a local interface 410, such as an internal bus.

The processing device 402 is adapted to execute commands stored in memory 404 and can comprise a general-purpose processor such as a microprocessor, one or more application-specific integrated circuits (ASICs), a plurality of suitably-configured digital logic gates, or other components comprised of discrete devices that coordinate the overall operation of the computer system 400. The memory 404 comprises any one or a combination of volatile memory elements (e.g., random access memory (RAM)) and nonvolatile memory elements (e.g., read-only memory (ROM), Flash memory, hard disk, etc.).

The user interface devices 406 comprise the components with which users interact with the computer system 400. By way of example, the user interface devices 406 comprise a keyboard, mouse, and display.

The telephone system interface devices 408 comprise devices that are capable of generating signals for transmission over an applicable telephone system and for receiving such signals. In the example embodiment of FIG. 4, the telephone system interface devices 408 include Signaling System 7 (SS7) hardware that enables connection to an SS7 network. In addition, the devices 408 can include TCP/IP hardware to enable connection to other networks.

The memory 404 includes various programs including an operating system 412, a communications system 414, and the automated call manager 216 described in the foregoing. The operating system 412 provides scheduling, input-output control, file and data management, memory management, and communication control, and that controls general operation of the computer system 400. The communications system 414 is configured to facilitate all communications to and from the computer system 400 over the telephone system. By way of example, the communications system 414 is based upon Signaling System 7 (SS7).

Various logic has been described herein. This logic can be stored on any computer-readable medium for use by or in connection with any computer-related system or method. In the context of this document, a computer-readable medium is an electronic, magnetic, optical, or other physical device or means that contains or stores a computer logic for use by or in connection with a computer-related system or method. This logic can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Example systems having been described above, operation of the systems will now be discussed. In the discussions that follow, flow diagrams are provided. Process steps or blocks in these flow diagrams may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Figure 5A:
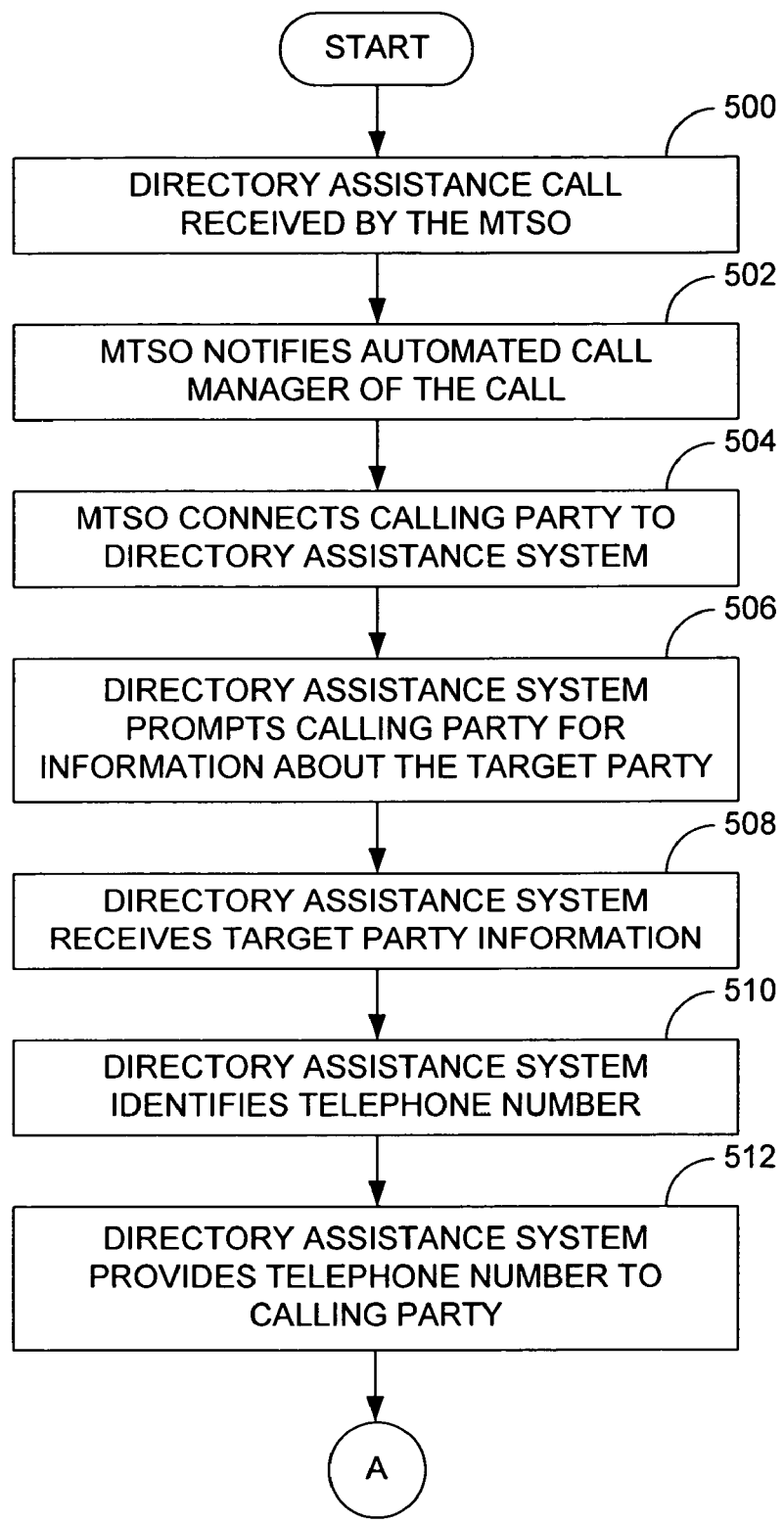
FIGS. 5A and 5B provide a flow diagram that illustrates a first embodiment of a method for automatic call completion.
Figure 5B:
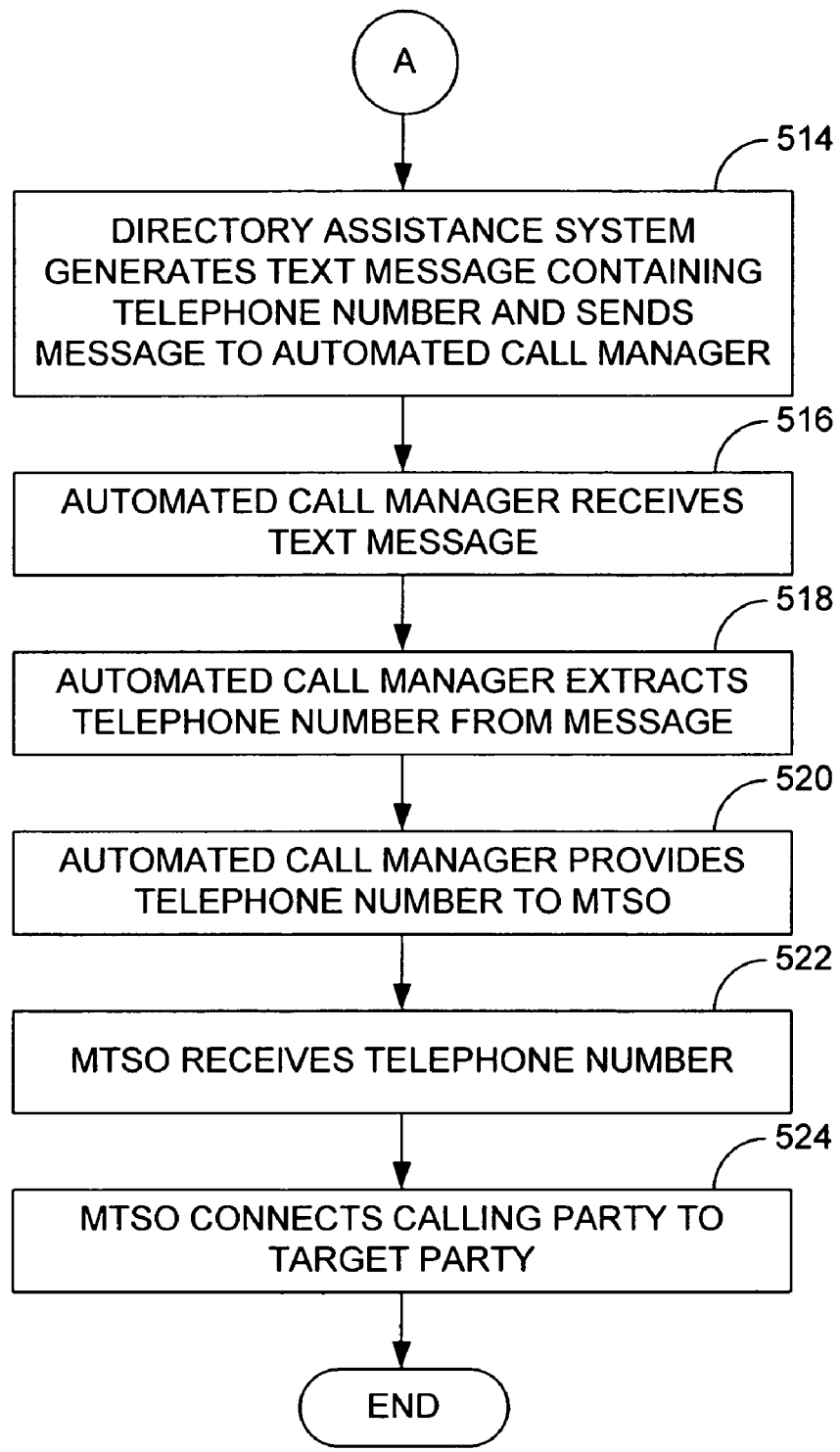

FIGS. 5A and 5B provide an example method for automatically completing a call in a directory assistance scenario. This method is practiced by the automated call completion system 300 (FIG. 3) in response to a calling party (e.g., party A of FIG. 2) placing a call to directory assistance (e.g., party B of FIG. 2) using a mobile telephone. Beginning with block 500 of FIG. 5A, the directory assistance call is received by the MTSO 206. Notably, if the call were placed using a land-based phone, the call would be received by another telephone switching control, such as local exchange 210. By way of example, the call is relayed to the MTSO 206 via a base station proximate to the calling party's telephone. Upon receiving the call, the MTSO 206 notifies the automated call manager 216 of the call, as indicated in block 502, for instance through a SS7 communication. Optionally, the automated call manager 216 can request status updates on the call from the MTSO 206 if the MTSO is not already configured to provide that information to the automated call manager. The MTSO 206 then connects the calling party to the directory assistance system 214, as indicated in block 504.

Once connected with the calling party, the directory assistance system 214 prompts the calling party for information about the target party (e.g., party C1 or C2 in FIG. 2), as indicated in block 506. By way of example, the directory assistance system 214 prompts the calling party to provide the name of the person or entity that the calling party wishes to call, and the city and state in which that person/entity resides. When the calling party responds, the directory assistance system 214 receives the target party information, as indicated in block 508.

Using the information provided by the calling party, the directory assistance system 214 identifies the telephone number of the target party, as indicated in block 510. By way of example, the voice information provided by the calling party is received by a live operator and used by that operator to manually look up the telephone number in a telephone number database. Alternatively, the voice information of the calling party is interpreted by a speech recognition device of the directory assistance system 214 and the information gleaned through that interpretation is used to look up the telephone number. After the target party telephone number has been identified, the directory assistance system 214 provides the telephone number to the calling party, as indicated in block 512. The directory assistance system 214 can provide the telephone number to the calling party in various ways. For example, the directory assistance system 214 can audibly provide the number to the calling party using a speech synthesizer. Alternatively or in addition, the number can be provided to the calling party in a text message. In the latter case, the text message can be used by the calling party for easy addition of the number to the calling party's address book, if desired.

At or around the same time the telephone number is provided to the calling party, the directory assistance system 214 generates a text message comprising the telephone number and sends the text message to the automated call manager 216, as indicated in block 514 of FIG. 5B. By way of example, the text message comprises a short message service (SMS) message. In some embodiments, the text message provided to the automated call manager 216 only comprises the telephone number to facilitate extraction and recognition of the number by the automated call manager. At this point, the directory assistance system 214 can disconnect from the call. The automated call manager 216 can receive this information from the MTSO 206 in a status update and, therefore, can take control over the call.

Turning to block 516, the automated call manager 216 receives the text message sent by the directory assistance system 214. The automated call manager 216 extracts the telephone number from the message, as indicated in block 518, and then provides the number to the MTSO 206, as indicted in block 520, to indicate to the MTSO to connect the call between the calling party and the target party. By way of example, the telephone number is provided to the MTSO 206 with a SS7 communication. At this point, the automated call manager 216 can, optionally, disconnect from the call.

The MTSO 206 then receives the telephone number from the automated call manager 216, as indicated in block 522, and connects the calling party to the target party, as indicated in block 524. Referring to FIG. 2, the calling party (party A) can be connected to target party C1, a mobile telephone user, or target party C2, a land-based telephone user. Notably, because the directory assistance system 214 (party B) dropped out of the call, only one trunk line is needed for the call between party A and party C1 or C2.

Figure 6:
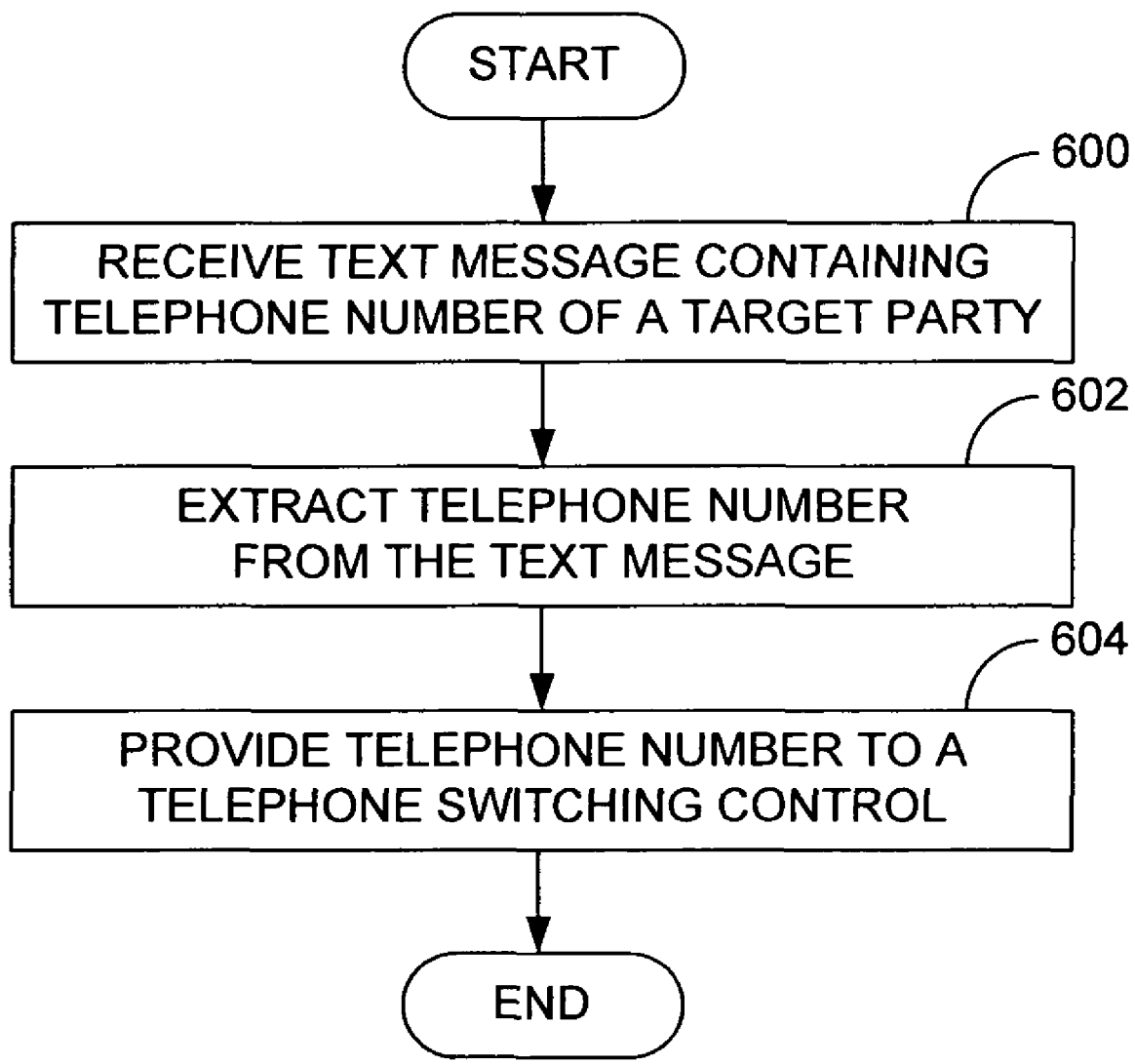
FIG. 6 is a flow diagram that illustrates a second embodiment of a method for automatic call completion.

FIG. 6 describes a further method for automatically completing a call. More particularly, FIG. 6 describes operation of the automated call manager 216 in facilitating automated call completion. The method of FIG. 6 includes receiving a text message containing a telephone number of a target party (block 600), extracting the telephone number from the text message (block 602), and providing the telephone number to a telephone switching control (block 604).

What is claimed is:

1. A method for automatically completing a call for a calling party, the method comprising:
    a telephone switching control receiving a directory assistance call placed by the calling party;
    the telephone switching control connecting the calling party to a directory assistance system;
    the directory assistance system providing a target telephone number to the calling party;
    the directory assistance system further sending a text message that contains the target telephone number to an automated call manager;
    the automated call manager receiving the text message sent by the directory assistance system;
    the automated call manager extracting the telephone number from the text message;
    the automated call manager providing the telephone number to the telephone switching control, and
    the telephone switching control connecting the calling party to the target telephone number such that the calling party is both provided with the target phone number and connected to the target phone number during the same call.

2. The method of claim 1, wherein sending a text message comprises sending a text message via a telephone network.

3. The method of claim 1, wherein sending a text message comprises sending a short message service (SMS) message.

4. The method of claim 1, wherein providing the telephone number to the telephone switching control comprises providing the telephone number to the telephone switching control via a telephone system.

5. The method of claim 1, wherein providing the telephone number to the telephone switching control comprises providing the telephone number to a mobile telephone switching office (MTSO).

6. The method of claim 5, wherein providing the telephone number to a mobile telephone switching office (MTSO) comprises providing the telephone number via a Signaling System 7 (SS7) communication.

7. The method of claim 1, further comprising the telephone switching control notifying the automated call manager of the directory assistance call upon receiving the directory assistance call.

8. The method of claim 7, further comprising the telephone switching control providing call status information to the automated call manager.

9. An automated call completion system stored on computer-readable media, the system comprising:

a directory assistance system configured to receive a directory assistance call from a calling party and provide a target telephone number to the calling party, the directory assistance system further being configured to generate and send a text message comprising the target party telephone number;

an automated call manager configured to, before the calling party terminates the directory assistance call, receive the text message generated and sent by the directory assistance system, to extract the telephone number contained in the text message, and to communicate the telephone number; and a telephone switching control configured to, before the calling party terminates the directory assistance call, receive the telephone number communicated by the automated call manager and connect the calling party to the telephone number.

10. The system of claim 9, wherein the telephone switching control is further configured to initially receive the directory assistance call and notify the automated call manager of the call.

11. The system of claim 9, wherein the telephone switching control comprises a mobile telephone switching office (MTSO) that is configured to receive calls from mobile telephones.

12. The system of claim 9, wherein the telephone switching control is further configured to provide call status information to the automated call manager.

* * * * *